United States Patent
Stretton et al.

(10) Patent No.: US 6,892,526 B2
(45) Date of Patent: May 17, 2005

(54) COWL STRUCTURE FOR A GAS TURBINE ENGINE

(75) Inventors: Richard G Stretton, Loughborough (GB); Kenneth F Udall, Derby (GB)

(73) Assignee: Rolls-Royce plc, London (GB)

( * ) Notice: Subject to any disclaimer, the term of this patent is extended or adjusted under 35 U.S.C. 154(b) by 57 days.

(21) Appl. No.: 10/361,511

(22) Filed: Feb. 11, 2003

(65) Prior Publication Data

US 2003/0163985 A1 Sep. 4, 2003

(30) Foreign Application Priority Data

Feb. 13, 2002 (GB) .............................................. 0203447

(51) Int. Cl.$^7$ .............................. B64D 29/06; F02K 3/06
(52) U.S. Cl. ...................... 60/226.1; 60/799; 244/53 B
(58) Field of Search ................................ 60/226.1, 799; 137/15.1; 244/53 B, 54

(56) References Cited

U.S. PATENT DOCUMENTS

| | | | | |
|---|---|---|---|---|
| 4,361,296 A | * | 11/1982 | Hall et al. | 244/54 |
| 5,524,847 A | * | 6/1996 | Brodell et al. | 244/54 |
| 5,609,313 A | * | 3/1997 | Cole et al. | 244/54 |
| 5,941,061 A | * | 8/1999 | Sherry et al. | 60/226.1 |
| 6,360,989 B1 | * | 3/2002 | Maguire | 244/53 B |
| 6,729,140 B2 | * | 5/2004 | Care et al. | 60/802 |

* cited by examiner

Primary Examiner—Michael Koczo, Jr.
(74) Attorney, Agent, or Firm—W. Warren Taltavull; Manelli Denison & Selter PLLC

(57) ABSTRACT

A cowl structure (18) for a gas turbine engine (10) comprises an outer skin (26) defining a first path for a load applied to the engine (10). The cowl structure (18) includes an inner skin (24) defining a second path for the load. The inner and outer skins (24, 26) are constructed such that a major proportion of the load is transmitted along the first path.

12 Claims, 4 Drawing Sheets

COWL STRUCTURE FOR A GAS TURBINE ENGINE

FIELD OF THE INVENTION

This invention relates to cowl structures for gas turbine engines.

BACKGROUND OF THE INVENTION

Known gas turbine engines used to power aircraft are subject to asymmetric aerodynamic loads, particularly at the point of take-off of the aircraft. Conventionally the nose region of the cowl structure surrounding the engine is bolted to the engine front flange, and this results in these aerodynamic loads being transmitted to the core of the engine and can result in deformation of the engine components.

SUMMARY OF THE INVENTION

According to the present invention there is provided a cowl structure for a gas turbine engine, the cowl structure comprising inner and outer skins constructed such that at least a major proportion of a load applied to the cowl structure is transmitted along the outer skin, wherein the cowl structure has a principal axis and the inner skin includes first, second and third sections arranged adjacent and in axial alignment with each other parallel to the principal axis of the cowl structure, the first section being resiliently mounted intermediate the third and second sections by joint means, the joint means permitting relative movement between the sections and insulating the second section from the adjacent cowl structure.

Preferably the outer skin is more rigid than the inner skin. The cowl structure may further include seal means between the adjacent edges of said first, second and third sections, the seal means extending substantially circumferentially around the inner skin.

The joint means may be flexible to allow said relative movement between the adjacent sections.

In one embodiment the joint means includes bearing means provided on at least one of the sections, and engagement means extending from the adjacent section to engage the bearing means.

The engagement means may include a plurality of bracket members substantially evenly spaced around and mounted on at least one of the sections.

The joint means may include resilient urging means to allow said relative movement between the adjacent sections. The resilient urging means may urge the adjacent sections away from each other.

The resilient urging means may comprise spring means, which extend substantially radially outward from the inner skin, to maintain alignment of the internal surfaces. The spring means may comprise a plurality of springs spaced around the cowl structure at regular intervals.

Covering means, which may comprise a projecting member preferably extends from one of the adjacent sections at the opposite side thereof to the joint means.

Guide means may be provided to guide the first section from a translated condition to a non-translated condition.

In the first embodiment where the joint means includes bearing means, the guide means may be provided on the engagement member and may be in the form of a sloping surface which may be on a leading portion thereof to engage the bearing means as the first and second sections are moved from the translated condition to the non-translated condition.

In the second embodiment, where the joint means comprises resilient urging means between the first and second sections, the guide means may comprise a tapered member extending from the first or second section through an aperture in the resilient urging means. Preferably, the tapered member extends from the second section through an aperture in the resilient urging means to releasably secure the resilient urging means to the second section.

The tapered member may comprise an elongate member tapering inwardly at its end remote from the second section. Preferably, the tapered member is in the form of a dowel.

A door may be provided in the cowl structure to provide access to the internal components of the engine.

BRIEF DESCRIPTION OF THE DRAWINGS

Embodiments of the invention will now be described by way of example only with reference to the accompanying drawings in which.

DETAILED DESCRIPTION OF THE INVENTION

Figure 1:
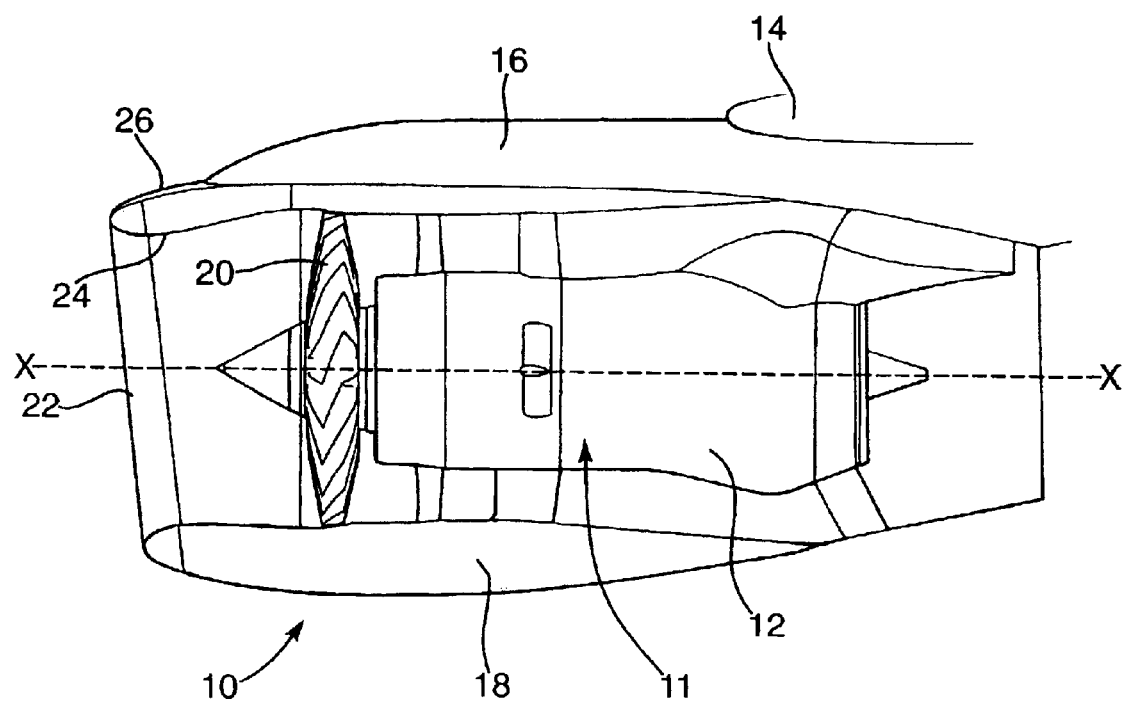
FIG. 1 is a diagrammatic, part cross-sectional view of a gas turbine engine.

Referring to FIG. 1, a gas turbine engine 10, having a principal axis X—X, is shown which, in the particular example shown, comprises a core 11 having a three shaft configuration (not shown), i.e. a high pressure turbine drives a high pressure compressor via a shaft, an intermediate pressure turbine drives an intermediate stage compressor via a further shaft, and a low pressure turbine which receives gas flow from the intermediate stage turbine, drives a fan 20 via a further shaft either directly or through gearing The high, intermediate and low-pressure turbines, and the high pressure and the intermediate stage compressor are housed within a housing 12 and are not shown in FIG. 1.

The engine 10 is mounted to a wing 14 of an aeroplane via a pylon 16.

Figure 2:
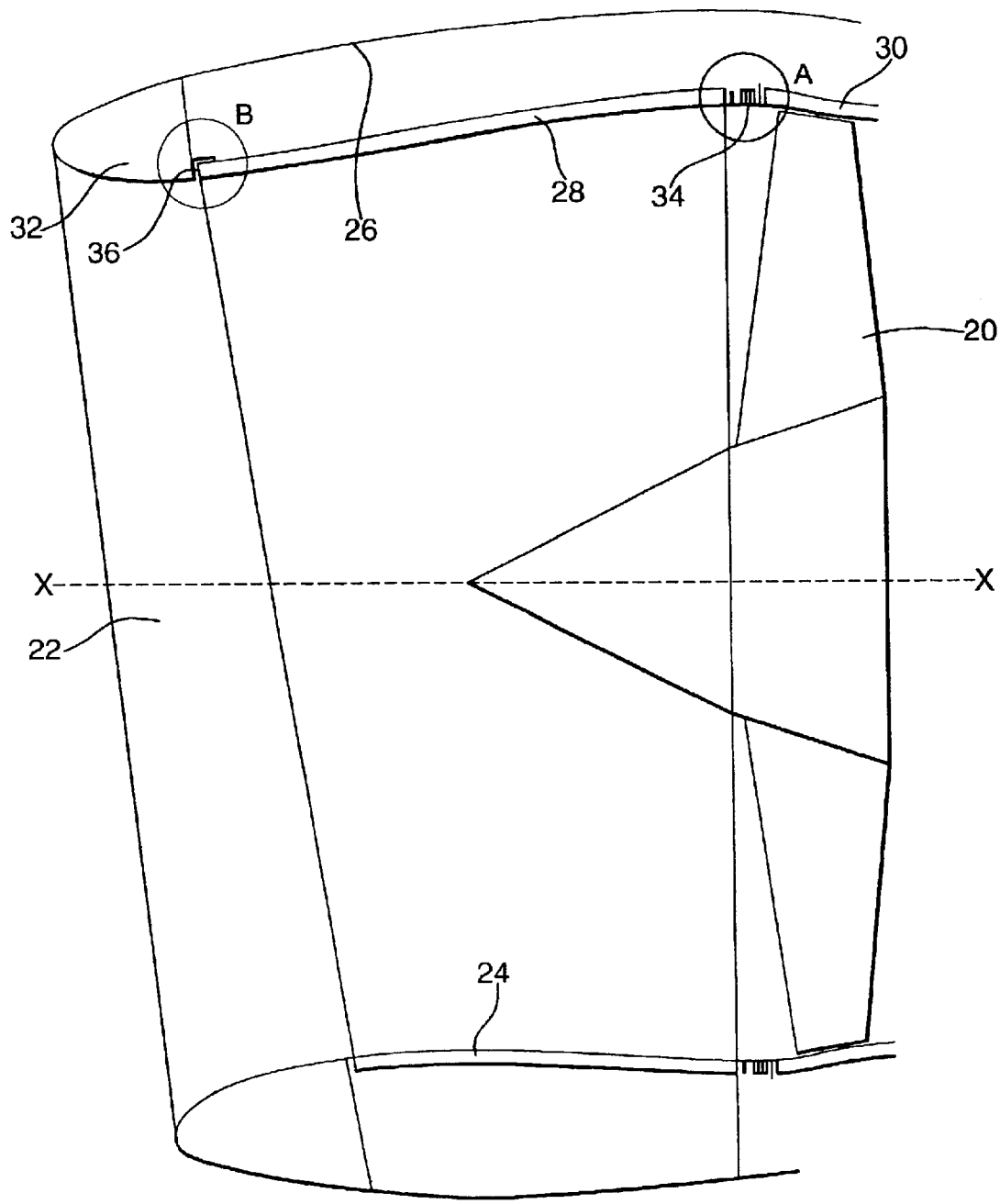
FIG. 2 is a diagrammatic sectional view of a front part of the engine shown in FIG. 1.

The core 11 described above is held within a cowl structure 18 having a principal axis aligned with the principal axis X—X of the engine 10. The fan 20 of the engine draws air into the engine 10. The cowl structure 18 extends forwardly of the fan 20 to define a nose region 22 of the cowl structure 18. The cowl structure 18 comprises an inner skin 24 and an outer skin 26. The inner skin 24 of the cowl structure comprises a first section 28 at the nose region 22 (see FIG. 2), and a second section 30 arranged downstream of the first section 28 in the direction of air flow through the engine 10, along the principal axis X—X of the engine 10. A third section 32 extends upstream from the first section 28. First joint means 34 is provided between the first and second sections 28, 30, and second joint means 36 are provided between the first and third sections 28, 32.

Figure 3:
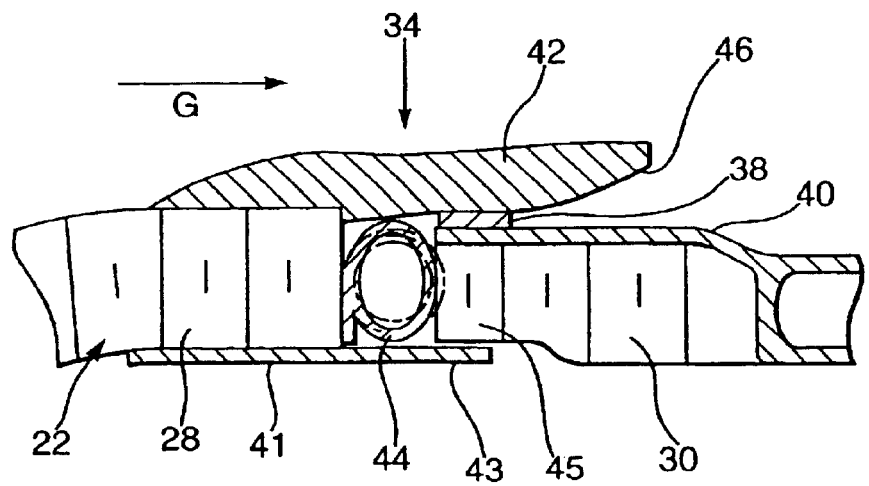
FIG. 3 is a view of one embodiment of the region marked A in FIG. 2.

Referring to FIG. 3, there is shown a first embodiment of the first joint means 34 between the first and second sections 28, 30. The first joint means 34 shown in FIG. 3 comprises a plurality of discrete bearing members 38 provided on the side 40 of the second section 30 facing the outer skin 26. The bearing members 38 are uniformly spaced about the circumference of the second section 30.

A plurality of uniformly spaced discrete engagement members in the form of brackets 42 are provided on the first section 28 at the edge thereof adjacent the second section 30. The first section 28 being resiliently mounted intermediate the third and second sections 32, 30 by joint means 34, the joint means 34 permitting relative movement between the sections and insulating the second section 30 from the adjacent cowl structure 18. The brackets 42 are provided on the same side of the first section 28 as the bearing members 38. Each bracket 42 is aligned with a respective one of the bearing members 38 and projects over the second section 30 to slidably engage the bearing member 38.

Covering means in the form of a projecting plate 43, having substantially spherical curvature, is provided on the side 41 of the first section 29. The projecting plate 43 extends from the edge of the first section 28 to the second section 30 and is received in an indented portion 45 provided on the second section 30.

The inner skin 24 is, thus, flexibly supported at the adjacent edges of the first and second sections 28, 30 at discrete positions around the cowling structure 18. The cowling structure 18 has a projecting member extending from one of the adjacent sections at the opposite side thereof to the joint means 34.

Seal means in the form of a P-shaped seal 44 is provided in the gap between the adjacent edges of the first and second sections 28, 30. The seal 44 is deformable between a non-deformed condition shown in dotted lines and a deformed condition shown in solid lines. As will be described below, the joint means 36 between the first and third sections 28, 32 provides a load on the joint means 34 such that the first and second sections 28, 30 are pushed together, thereby deforming the seal 44.

In order to carry out maintenance and other work on the engine 10 it is often necessary to translate the nose region 22 forwardly in the direction of the arrow F. When this happens, there is some downward displacement by gravity of the nose region 22 relative to the rest of the cowling structure 18. When the nose region 22 is translated in the direction or the arrow G, the first section 28 should be aligned with the second section 30. To ensure such alignment, each bracket 42 is provided with a tapered lower leading edge surface 46. When the nose region 42 is translated in the direction of the arrow G, the surface 46 of the bracket 42 slides over the bearing member 40, thereby positioning the first section 28 in alignment with the second section 30.

Figure 4:
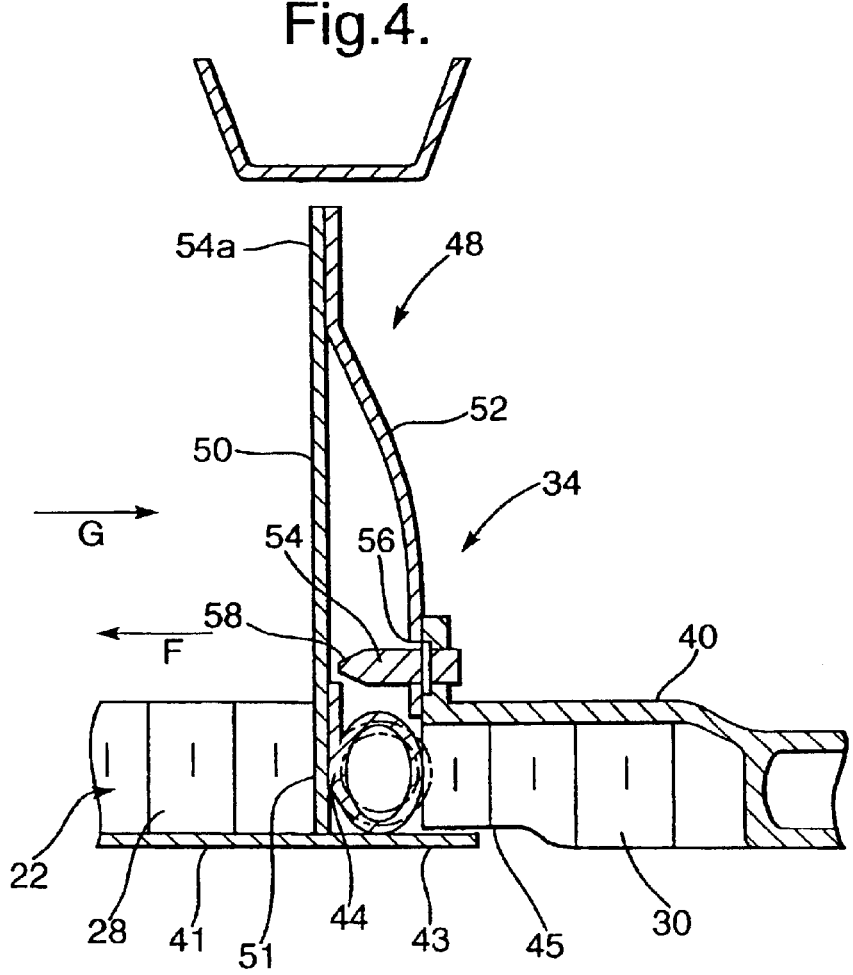
FIG. 4 is a view of another embodiment of the region marked A in FIG. 2.

Referring to FIG. 4, there is shown an alternative embodiment to that shown in FIG. 3 in which a plurality of first resilient urging means 48 are spaced uniformly around the adjacent edges of the first and second sections 28, 30. Each first resilient urging means 48 comprises a support member 50 and a spring member 52. The support member 50 extends substantially radially outwardly from the edge of the first section 28 and the spring member 52 extends from the free end 54a of the support member 50 to the edge of the second section 30.

A dowel 54 provided at the edge of the second section 30 projects through an aperture 56 in the spring member 52, the dowel 54 being provided with a tapering end region 58. When the nose region 22 is translated in the direction of the arrow F, the spring member 52 is disengaged from the edge of the second section 30. When this happens, as described above, the nose region 22 drops slightly However, when the nose region 22 is translated In the opposite direction as indicated by the arrow G, the edge of the aperture 56 slides over the tapered end region 58 of the dowel 54 thereby ensuring that the nose region 22 is lifted back to its position, as shown in FIG. 4, where the first section 28 is aligned with the second section 30.

In each of the embodiments shown in FIGS. 3 and 4, the joint means 34 is flexible and does not allow a pitch or yaw couple on the first section 28 to be transmitted to the second section 30. A similar flexibility is provided at the second joint means 36 between the first section 28 and the third section 32, as discussed below. In combination, the flexibility between the first and second sections 28 and 30, and between the first and third sections 28 and 32, isolates the second section 30 from vertical and aide forces originating at or close to the third section 32.

The second joint means 36 (FIG. 5) comprises a plurality of second resilient urging means 60 substantially uniformly spaced around the adjacent edges of the first and third sections 28, 32. Each second resilient urging means 60 comprises a support member 62 extending radially outwardly from the first section 32. The support member 62 is connected at one end 64 to the third section 32, and a spring member 66 is connected to the opposite end region 68 of the support member 62. The spring member 66 extends between the end region 68 and the edge of the first section 28.

Sealing means 70 is provided between the edge of the first section 28 and the third section 32. The sealing means 70 is in the form of a circular seal or P-shaped seal, similar to the seal 44 shown in FIGS. 3 and 4.

Figure 5:
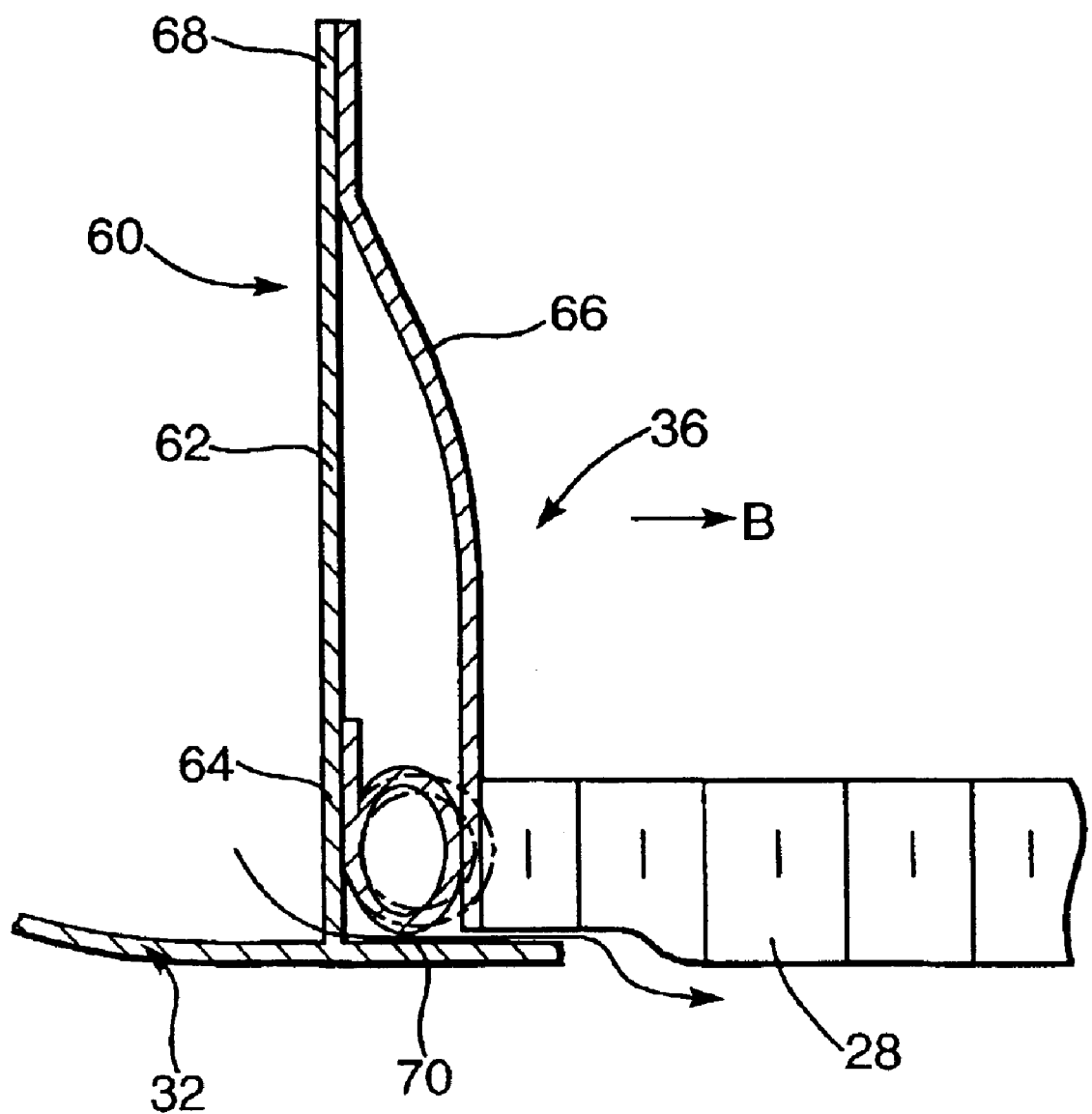
FIG. 5 is a view of the region marked B in FIG. 2.

The spring means 60 exerts a force on the section 28 in the direction indicated by the arrow B in FIG. 5, whereby to urge the first section 28 towards the second section 30, thereby ensuring that the joint 34 retains its integrity.

Thus, the first section 28 of the inner akin 24 is supported at its opposite ends by respective flexible joints 34, 36. A major proportion of any load applied to the nose region 22 will be transmitted along the more rigid outer skin 26, to the pylon 16 and the wing 14, in preference to the inner skin 24. In particular, where the load on the nose region 22 is applied upwardly, for example on take off, greater than 90% of the load can be transmitted along the outer skin. This transmission of loads directs them away from the core 11 of the engine 10 and avoids deformation of engine components within the core 11.

In order to facilitate the transmission of such loads along the outer skin, rigid members are provided between regions of the cowl structure where it is necessary to allow access to the fan case mounted engine accessories. For example, rigid elongate bars may be provided between fixed regions of the cowl structure, these bars extending across regions of the cowl structure that are in the form of doors which can be pivotally opened at a hinge. Alternatively, a slideable region of the cowl structure can replace the door structure. In such cases, the slideable regions may themselves be sufficiently rigid to allow said load to be transmitted there along. A further alternative is the provision of rigid doors within a fixed cowl to provide access to fan case mounted engine accessories.

Various modifications can be made without departing from the scope of the invention. For example, the inner skin may be constructed so that the entire load applied upwardly on the nose region 22 on takeoff is transmitted along the outer skin.

Whilst the present invention has been described with reference to the nose region 22 of the cowl structure 18 which extends forward of the fan 20, it will be appreciated by one skilled in the art that it is equally applicable to other sections of the cowl structure 18 For example the invention could be used in the region of the cowl structure 18 downstream of the engine 10, which forms the exhaust nozzle.

The present invention is of particular benefit in high-speed applications where there is a need to minimise steps and gaps in the outer skin 26 of the cowl structure 18 for aerodynamic purposes.

What is claimed is:

1. A cowl structure for a gas turbine engine, the cowl structure comprising inner and outer skins constructed such that at least a major proportion of a load applied to the cowl structure is transmitted along the outer skin, wherein the cowl structure has a principal axis and the inner skin includes first, second and third sections arranged adjacent and in axial alignment with each other parallel to the principal axis of the cowl structure, the first section being resiliently mounted intermediate the second and third sections by joint means, the joint means permitting relative movement between the sections and insulating the second section from the adjacent cowl structure, the joint means including bearing means provided on at least one of the sections, and engagement means extending from the adjacent section to engage said bearing means.

2. A cowl structure as claimed in claim 1 in which the outer skin is more rigid than the inner skin.

3. A cowl structure as claimed in claim 1 in which seal means are provided between the adjacent edges of the first, second and third sections, the seal means extending substantially circumferentially around the inner skin.

4. A cowl structure as claimed in claim 1 wherein the joint means are flexible to allow said relative movement between the adjacent sections.

5. A gas turbine engine incorporating a cowl structure as claimed in claim 1.

6. A cowl structure for a gas turbine engine, the cowl structure comprising inner and outer skins constructed such that at least a major proportion of a load applied to the cowl structure is transmitted along the outer skin, wherein the cowl structure has a principal axis and the inner skin includes first, second and third sections arranged adjacent and in axial alignment with each other parallel to the principal axis of the cowl structure, the first section being resiliently mounted intermediate the second and third sections by joint means, the joint means permitting relative movement between the sections and insulating the second section from the adjacent cowl structure, the joint means including bearing means provided on at least one of the sections, and engagement means extending from the adjacent section to engage said bearing means, wherein the engagement means comprises a plurality of bracket members substantially evenly spaced around and mounted on at least one of the sections.

7. A cowl structure for a gas turbine engine, the cowl structure comprising inner and outer skins constructed such that at least a major proportion of a load applied to the cowl structure is transmitted along the outer skin, wherein the cowl structure has a principal axis and the inner skin includes first, second and third sections arranged adjacent and in axial alignment with each other parallel to the principal axis of the cowl structure, the first section being resiliently mounted intermediate the second and third sections by joint means, the joint means permitting relative movement between the sections and insulating the second section from the adjacent cowl structure including a projecting member extending from one of the adjacent sections at the opposite side thereof to the joint means.

8. A cowl structure for a gas turbine engine, the cowl structure comprising inner and outer skins constructed such that at least a major proportion of a load applied to the cowl structure is transmitted along the outer skin, wherein the cowl structure has a principal axis and the inner skin includes first, second and third sections arranged adjacent and in axial alignment with each other parallel to the principal axis of the cowl structure, the first section being resiliently mounted intermediate the second and third sections by joint means, the joint means permitting relative movement between the sections and insulating the second section from the adjacent cowl structure, the cowl structure being movable between translated and non-translated conditions relative to the remainder of the engine, the guide means are provided to guide the first section from the translated condition to the non-translated condition.

9. A cowl structure for a gas turbine engine, the cowl structure comprising inner and outer skins constructed such that at least a major proportion of a load applied to the cowl structure is transmitted along the outer skin, wherein the cowl structure has a principal axis and the inner skin includes first, second and third sections arranged adjacent and in axial alignment with each other parallel to the principal axis of the cowl structure, the first section being resiliently mounted intermediate the second and third sections by joint means, the joint means permitting relative movement between the sections and insulating the second section from the adjacent cowl structure, wherein the joint means includes bearing means provided on at least one of the sections, and engagement means extending from the adjacent section to engage the bearing means wherein said guide means comprises a sloping surface on a leading portion of said engagement means, the sloping surface engaging the bearing means as the first and second sections are moved from the translated condition the non-translated condition.

10. A cowl structure for a gas turbine engine, the cowl structure comprising inner and outer skins constructed such that at least a major proportion of a load applied to the cowl structure is transmitted along the outer skin, wherein the cowl structure has a principal axis and the inner skin includes first, second and third sections arranged adjacent and in axial alignment with each other parallel to the principal axis of the cowl structure, the first section being resiliently mounted intermediate the second and third sections by joint means, the joint means permitting relative movement between the sections and insulating the second section from the adjacent cowl structure wherein the joint means includes resilient urging means to allow said relative movement between the sections and urge the adjacent sections away from each other, the resilient urging means comprises spring means wherein the guide means comprises co-operating formations provided on the first or the second sections, the formations associated with components of the resilient urging means provided between the first and second sections, the co-operating formations comprising tapered members mounted on one side of the first and second sections, the tapered members engaging with complementary apertures in associated components of said resilient urging means.

11. A cowl structure for a gas turbine engine, the cowl structure comprising inner and outer skins constructed such that at least a major proportion of a load applied to the cowl structure is transmitted along the outer skin, wherein the cowl structure has a principal axis and the inner skin includes first, second and third sections arranged adjacent and in axial alignment with each other parallel to the principal axis of the cowl structure, the first section being resiliently mounted intermediate the second and third sections by joint means, the joint means permitting relative movement between the sections and insulating the second section from the adjacent cowl structure, the cowl structure is movable between translated and non-translated conditions relative to the remainder of the engine, the guide means are provided to guide the first section from the translated condition to the non-translated condition the engagement means comprises a plurality of bracket members substantially evenly spaced around and mounted on at least one of the sections wherein said guide means comprises a sloping surface on a leading portion of said engagement means the sloping surface engaging the bearing means as the first and second sections are moved from the translated condition to the non-translated condition.

12. A cowl structure for a gas turbine engine, the cowl structure comprising inner and outer skins constructed such that at least a major proportion of a load applied to the cowl structure is transmitted along the outer skin, wherein the cowl structure has a principal axis and the inner skin includes first, second and third sections arranged adjacent and in axial alignment with each other parallel to the principal axis of the cowl structure, the first section being resiliently mounted intermediate the second and third sections by joint means, the joint means permitting relative movement between the sections and insulating the second section from the adjacent cowl structure wherein the joint means includes resilient urging means to allow said relative movement between the sections and urge the adjacent sections away from each other, the resilient urging means comprises spring means wherein the guide means comprises co-operating formations provided on the first or the second sections, the formations associated with components of the resilient urging means provided between the first and second sections, the co-operating formations comprise tapered members mounted on one side of the first and second sections, the tapered members engaging with complementary apertures in associated components of said resilient urging means, the cowl structure having internal surfaces across which air can pass in use, wherein the spring means extends substantially radially outwardly from the inner skin, to maintain alignment of the internal surfaces.

* * * * *